(12) United States Patent
Bieger

(10) Patent No.: US 10,102,826 B2
(45) Date of Patent: Oct. 16, 2018

(54) METHOD FOR OPERATING A DISPLAY DEVICE FOR A VEHICLE

(71) Applicant: CONTINENTAL AUTOMOTIVE GMBH, Hannover (DE)

(72) Inventor: Stefan Bieger, Nidda (DE)

(73) Assignee: Continental Automotive GmbH, Hannover (DE)

( * ) Notice: Subject to any disclaimer, the term of this patent is extended or adjusted under 35 U.S.C. 154(b) by 121 days.

(21) Appl. No.: 15/196,913

(22) Filed: Jun. 29, 2016

(65) Prior Publication Data

US 2017/0004809 A1 Jan. 5, 2017

(30) Foreign Application Priority Data

Jun. 30, 2015 (DE) .......................... 10 2015 212 223

(51) Int. Cl.
*B60K 35/00* (2006.01)
*B60R 1/00* (2006.01)
*G02B 27/01* (2006.01)
*G09F 9/00* (2006.01)
*G09G 5/10* (2006.01)
(Continued)

(52) U.S. Cl.
CPC .............. *G09G 5/37* (2013.01); *B60K 35/00* (2013.01); *B60R 1/00* (2013.01); *G02B 27/01* (2013.01); *G09F 9/00* (2013.01); *G09G 5/10* (2013.01); *G09G 5/38* (2013.01); *B60R 2300/20* (2013.01); *B60R 2300/80* (2013.01); *G02B 2027/0121* (2013.01); *G02B 2027/0141* (2013.01); *G09G 2340/0464* (2013.01); *G09G 2360/04* (2013.01); *G09G 2360/144* (2013.01); *G09G 2380/10* (2013.01)

(58) Field of Classification Search
None
See application file for complete search history.

(56) References Cited

U.S. PATENT DOCUMENTS 7,134,707 B2 11/2006 Isaac
7,289,085 B2 10/2007 Adams et al.
(Continued)

FOREIGN PATENT DOCUMENTS

CN 1751334 3/2006
CN 101954884 1/2011
(Continued)

*Primary Examiner* — Mark Zimmerman
*Assistant Examiner* — Yu-Jang Tswei
(74) *Attorney, Agent, or Firm* — Cozen O'Connor

(57) ABSTRACT

A method includes: determining a glare effect in a first partial region of the first display device in which an item of information is represented as an image; sorting items of information according to relevance if a plurality of items of information is represented on the first display device; checking and establishing that a glare effect in a second partial region of the first display device or on a second display device is lower than the glare effect in the first partial region; checking and establishing that no item of information, or an item of information with lower relevance, is represented in the second partial region of the first display device or on the second display device; and representing the one item of information, or the one item of information with a higher relevance, in the second partial region of the first display device or on the second display device.

9 Claims, 1 Drawing Sheet

(51) Int. Cl.
*G09G 5/37* (2006.01)
*G09G 5/38* (2006.01)

(56) References Cited

U.S. PATENT DOCUMENTS

| | | | |
|---|---|---|---|
| 8,589,034 B2 | 11/2013 | Kwok | |
| 2012/0154591 A1* | 6/2012 | Baur | ............ B60R 1/00 |
| | | | 348/148 |
| 2013/0097542 A1* | 4/2013 | Icho | ........ G06F 17/30032 |
| | | | 715/769 |
| 2013/0127689 A1 | 5/2013 | Gollier | |

FOREIGN PATENT DOCUMENTS

| | | |
|---|---|---|
| CN | 103069327 | 4/2013 |
| CN | 203580657 | 5/2014 |
| CN | 103957399 | 7/2014 |
| DE | 102008043828 A1 | 5/2010 |
| DE | 102012201322 A1 | 8/2013 |
| DE | 112013000197 T5 | 8/2015 |
| EP | 1 487 659 B1 | 12/2004 |
| GB | 2465470 A | 5/2010 |
| JP | 2002347476 A | 12/2002 |
| WO | WO 2015/025 439 A1 | 2/2015 |

\* cited by examiner

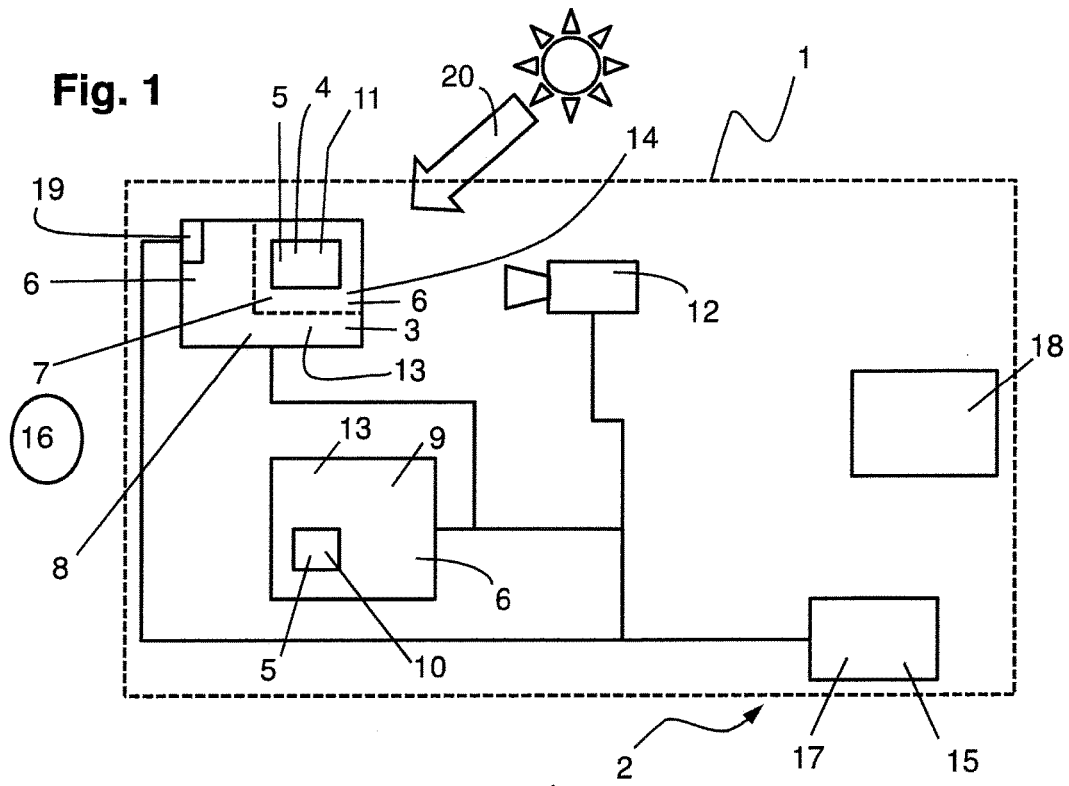
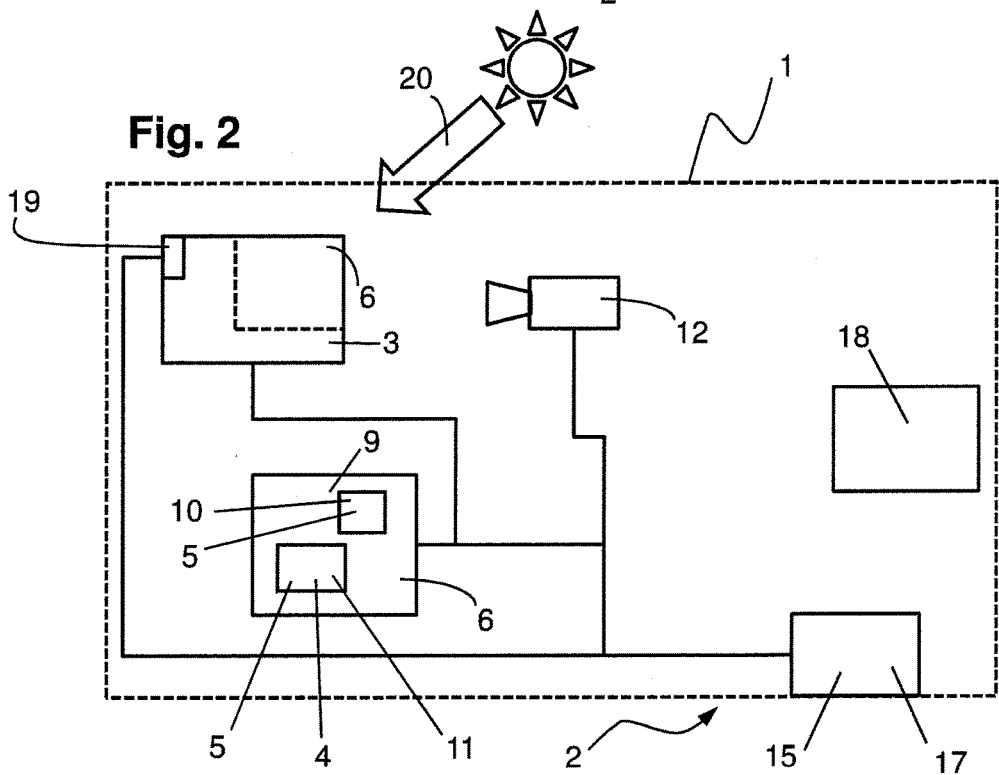

METHOD FOR OPERATING A DISPLAY DEVICE FOR A VEHICLE

BACKGROUND OF THE INVENTION

1. Field of the Invention

The invention relates to a method for displaying images on a display device where a glare effect is established, as well as an apparatus for carrying out the method, and a computer program product for carrying out the method through the apparatus.

2. Description of the Related Art

In contemporary vehicles more and more display devices (displays such as cluster displays, head unit displays, rear seat entertainment; projection surfaces, e.g., front screens for head-up displays, rear screens for rear screen head-up displays etc.) are installed for the representation and/or display of items of information, in particular image information.

When representing items of information on these display devices, unfavorable light conditions and unfavorable incoming light can lead to an impairment of the readability of the represented items of information.

The way in which a glare effect, or an impairment of the readability resulting from light reflection or similar for an occupant of a vehicle, can be established is known from the prior art.

Establishing a dazzle effect, and tilting or turning a display device so that light entering the vehicle is reflected in a different direction in order to reduce the glare effect, are known from JP 2002-347476 A, which describes a sensor that makes it possible to determine the angle of the incoming light to the display device.

A method for the operation of a display device for the output of images is known from DE 10 2012 201 322 A1, wherein the glare effect (or the glare characteristic) of an image represented on the display device is detected and determined by a camera. Depending on the detected glare effect, the contrast and/or the colors of the represented image are adjusted, or the transparency of the image region is reduced (e.g., if the display device is implemented as a projection surface, e.g., a head-up display).

A method for determining technical parameters of the light of a sign that can be projected in front of a screen of a vehicle is known from DE 10 2008 043 828 A1. In this reference, the readability of the display of a head-up display even under difficult light conditions is ensured in that the light density and the color of the sign is coordinated to the background (the light conditions in the surroundings of the vehicle).

The known approaches to a solution frequently require an increased expenditure and complexity of the measuring equipment and/or still do not achieve a satisfactory readability for the vehicle occupant, at least in some unfavorable situations.

SUMMARY OF THE INVENTION

It is an object of the invention to overcome at least partially the problems outlined in relation to the prior art, and in particular to ensure that important items of information is presented in a way that can easily be recognized by the driver of a vehicle.

These objects may be achieved, in accordance with one aspect of the invention, with a method as described herein. It is to be noted that individually described features can be combined with one another in any desired, technically reasonable manner, and define further embodiments of the invention. In addition, the features are made more precise and explained in the description, where further preferred embodiments of the invention are presented.

In accordance with an aspect of the invention, a method for operating at least a first display device for the display of images is accordingly proposed, wherein at least one item of information in the form of an image can be represented on the at least one first display device, and which at least indicatively comprises the following steps, in particular in the sequence specified below:

a) determining a glare effect in at least one first partial region of the at least one first display device in which at least one item of information is represented in the form of an image;

b) sorting items of information according to relevance if a plurality of items of information is represented on the at least one first display device;

c) checking and establishing that a glare effect in a second partial region of the first display device or on a second display device is less than in the first partial region;

d) checking and establishing that no item of information, or an item of information with lower relevance, is represented in the second partial region of the first display device or on the second display device; and e) representing the at least one item of information, or the at least one item of information with higher relevance, in the second partial region of the first display device or on the second display device.

It is thus in particular proposed that the items of information currently displayed, requested or required on the display device or the plurality of display devices are sorted according to relevance and, in particular in the case in which a glare effect has been established, the items of information with higher relevance are represented in easily readable partial regions of display devices.

Thus if, for example, the turn instruction of a navigation system is represented on the display device of the central head-unit display, and if this is, however, difficult to read as a result of direct sunshine, the turn instruction can also be shown on the cluster display which is more easily readable in the current situation. On the other hand, when driving at night, the display device in the central head-unit display may itself be responsible for dazzling the driver. In this case the display device can be dimmed or switched off, and the items of information of higher relevance can instead be shown on a different display (e.g., the cluster display or head-up display).

In particular thus at least the first partial region is dimmed or switched off when a glare effect originating from the first partial region is determined.

The relevance of the items of information can, of course, also depend on events (the emergence of obstacles, turning procedures, parking procedures, incoming or outgoing telephone calls, instructions from navigation systems), so that the display of items of information on the at least one first display device or on the second display device is adapted or can be varied, in particular continuously.

Even if the process of determining relevance and/or sorting according to relevance of items of information is integrated here into the method, the following partial steps can also, however, be carried out equally well separately, if appropriate before and/or after the method:

i) assigning a relevance (or a characteristic relevance value) to one or to a plurality of items of information when a plurality of items of information is represented on a display device, ii) sorting the items of information according to their assigned relevance.

According to an advantageous embodiment, the glare effect is detected by at least one camera. It is also, however, possible to use sensors, such as are, for example, known from JP 2002-347476 A1 cited above, to determine a glare effect.

It is in particular advantageous to adapt the representation of the at least one item of information to the available size of the second partial region of the first display device and/or of the second display device with a lower glare effect.

In particular, the item of information that is now displayed in a different area and/or on a different display device as a result of the glare effect may be reduced in size or enlarged or, for example, represented with different light density.

Preferably, in step a) a threshold value for the glare effect is taken into account, wherein the method only continues with step b) and/or with step c) when the threshold value is exceeded.

An apparatus for operating at least a first display device for the display of images is further proposed, wherein the apparatus comprises at least
- a control device that carries out the method proposed here,
- at least one display device for the display of images, and
- at least one camera and/or one sensor for the determination of a glare effect in at least a first partial region of the at least one first display device.

A computer program product on a non-transitory computer-readable medium with program code for carrying out the method proposed here is also included, when the computer program product is executed on an apparatus described above.

According to a development, furthermore, a vehicle is proposed comprising at least one operating unit for operating the vehicle as well as an apparatus according to the invention or an apparatus that executes the computer program product according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and the technical environment are explained below with reference to the figures. It is to be noted that the figures show particularly preferred variant embodiments of the invention, but is not however restricted to them. The same components in the figures are here given the same reference signs. In the drawings:

FIG. 1: schematically shows a vehicle situation illustrating one aspect of the present invention; and FIG. 2: schematically shows a vehicle situation illustrating another aspect of the present invention.

DETAILED DESCRIPTION OF THE PRESENTLY PREFERRED EMBODIMENTS

FIG. 1 shows a vehicle 1 viewed from above, and illustrates steps a) to d) of the method as discussed above. The vehicle comprises an operating unit 18 configured to operate the vehicle 1 and an apparatus 2 with a computer program 17. The apparatus 2 operates the display devices 3, 9 and includes a control device 15, in this case operating two display devices 3, 9 for the display of images 4, as well as a camera 12 and a sensor 19 to determine a glare effect 6 at the first display device 3.

The vehicle 1 is irradiated from the side by a light source, so that the first display device 3 is subjected to incoming light 20. An item of information 5 in the form of an image 4 is displayed in the first partial region 7 of the first display device 3. In the course of step a) of the method, a glare effect 6 is determined in at least the first partial region 7 of the first display device 3. A threshold value 14 for the glare effect 6 is taken into account in step a), where the method only continues with step b) or with step c) when the threshold value 6 is exceeded.

In the course of step b) a determination is made that an item of information 5 is also displayed on the display device 9. The items of information 5 are then sorted according to relevance. In the course of step c) it is checked and established that a glare effect 6 is less on the second display device 9 than it is in the first partial region 7. In the course of step d) it is checked and established that an item of information 5 on the second display device 9 is of lower relevance 10 than is the item of information 5, with higher relevance 11, represented in the first partial region 7.

The relevance of the items of information 5 can here depend on an event 16 (in this case, the emergence of an obstacle in front of the vehicle 1), so that the representation of items of information 5 on the at least one first display device 3 or on the second display device 9 is adapted or can be varied, in particular continuously.

FIG. 2 shows the vehicle 1 from FIG. 1, and step e) of the method. In the course of step e) the item of information 5 with higher relevance 11 is displayed on the second display device 9. The item of information 5 with lower relevance 10 is, in this case, arranged elsewhere on the second display device 9.

The representation of the item of information 5 of higher relevance 11 is adapted to the available size 13 of the second display device 9 with the lower glare effect 6.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating at least a first display device (3) for display of images (4), wherein one or more items of information (5), each in the form of an image (4), can be represented on the at least one first display device (3), the method comprising:

a) determining a glare effect (6) in at least one first partial region (7) of the at least one first display device (3) in which at least one of the one or more items of information (5) is represented in the form of an image (4);

b) sorting items of information (5) according to relevance if a plurality of items of information (5) is represented on the at least one first display device (3);

c) checking and establishing that a glare effect (6) in a second partial region (8) of the first display device (3) or on a second display device (9) is lower than the glare effect (6) in the first partial region (7);

d) checking and establishing that no item of information (5), or an item of information (5) with lower relevance (10) than the at least one of the one or more items of information (5), is represented in the second partial region (8) of the first display device (3) or on the second display device (9); and e) in a case in which it is established that no item of information (5), or an item of information (5) with lower relevance (10), is represented in the second partial region (8) of the first display device (3) or on the second display device (9), representing the at least one of the one or more items of information (5), or the at least one item of information (5) with a higher relevance (11) than the item of information (5) with the lower relevance (10), in the second partial region (8) of the first display device (3) or on the second display device (9).

2. The method as claimed in claim 1, further comprising dimming or switching off at least the first partial region (7) when a glare effect (6) originating from the first partial region (7) is detected.

3. The method as claimed in claim 1, further comprising evaluating the relevance of the items of information (5) depending on events (16), so that the representation of items of information (5) on the at least one first display device (3) or on the second display device (9) is adapted continuously.

4. The method as claimed in claim 1, wherein the glare effect (6) is detected by at least one camera (12).

5. The method as claimed in claim 1, wherein the representation of the at least one item of information (5) is adapted to an available size (13) of the second partial region (8) of the first display device (3) and/or of the second display device (9) with a lower glare effect (6).

6. The method as claimed in claim 1, wherein in the determining in step a) a threshold value (14) for the glare effect (6) is taken into account, the method only continuing to step b) or to step c) when the threshold value (14) is exceeded.

7. An apparatus (2) for operating at least a first display device (3) for the display of images (4), the apparatus (2) comprising:

a control device (15) configured to carry out the method as claimed in claim 1;

at least one display device (3, 9) configured to display images (4); and at least one camera (12) and/or one sensor (19) configured to determine the glare effect (6) in at least the first partial region (7) of the at least one display device (3, 9).

8. A vehicle (1) comprising at least one operating unit (18) configured to operate the vehicle (1) and an apparatus (2) as claimed in claim 7.

9. A non-transitory computer readable medium storing program code, which, when executed on a program-controlled apparatus, causes the apparatus to carry out the method as claimed in claim 1.

\* \* \* \* \*